United States Patent

Murata et al.

[11] Patent Number: 6,143,840
[45] Date of Patent: Nov. 7, 2000

[54] POLYESTER RESIN COMPOSITION, CURED RESIN, AND COATING MATERIAL

[75] Inventors: Shigeru Murata, Suzuka; Toshio Yamauchi; Ryoichi Fujitani, both of Yokkaichi, all of Japan

[73] Assignee: Kyowa Yuka Co., Ltd., Tokyo, Japan

[21] Appl. No.: 09/380,497

[22] PCT Filed: Mar. 13, 1998

[86] PCT No.: PCT/JP98/01060

§ 371 Date: Sep. 3, 1999

§ 102(e) Date: Sep. 3, 1999

[87] PCT Pub. No.: WO98/41578

PCT Pub. Date: Sep. 24, 1998

[30] Foreign Application Priority Data

Mar. 7, 1997 [JP] Japan .................................. 9-062576

[51] Int. Cl.[7] .................................................. C08F 20/00
[52] U.S. Cl. ........................... 525/443; 528/272; 525/437
[58] Field of Search ............................ 528/272; 525/437, 525/443

[56] References Cited

FOREIGN PATENT DOCUMENTS

| 0545108 | 6/1993 | European Pat. Off. . |
|---|---|---|
| 6287268 | 10/1994 | Japan . |
| 6287441 | 10/1994 | Japan . |
| 7082333 | 3/1995 | Japan . |
| 9255767 | 2/1997 | Japan . |
| 9071668 | 3/1997 | Japan . |
| 9031172 | 9/1997 | Japan . |

*Primary Examiner*—Samuel A. Acquah
*Attorney, Agent, or Firm*—White & Case LLP

[57] ABSTRACT

The present invention provides a resin composition containing a polyester resin processing, within its molecular structure, a structural unit represented by the following formula (I), and an amino resin:

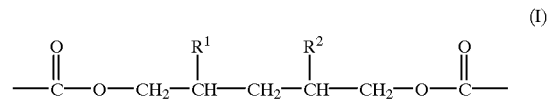

[wherein, $R^1$ and $R^2$ are the same or different and each represents a hydrogen atom or lower alkyl, with the proviso that $R^1$ and $R^2$ do not simultaneously represent hydrogen atoms]. In addition, the present invention provides a cured resin obtained by means of hardening said resin composition, and a paint containing said resin composition. The aforementioned resin composition provides a cured material that exhibits excellent resistance to hydrolysis, resistance to alkali, and resistance to cissing, and thus is suitable for a paint and the like.

7 Claims, No Drawings

POLYESTER RESIN COMPOSITION, CURED RESIN, AND COATING MATERIAL

TECHNICAL FIELD

The present invention relates to a polyester resin composition useful as a paint and the like, which exhibit excellent resistance to hydrolysis, resistance to alkali and resistance to cissing, a cured resin, and a paint.

BACKGROUND ART

Polyester resins are produced by means of an esterification reaction and/or a transesterification reaction of a polybasic acid and a polyhydric alcohol, in the presence of an animal or vegetable oil fatty acid, or an animal or vegetable oil, if necessary, and are widely employed for various uses such as a paint and the like.

Hitherto, known examples of a polyhydric alcohol for preparing a polyester resin include dihydric alcohols such as ethylene glycol, diethylene glycol, triethylene glycol, propylene glycol, dipropylene glycol, 1,3-butanediol, 1,4-butanediol, neopentylglycol, and the like; trihydric alcohols such as glycerin, trimethylolethane, trimethylolpropane, and the like; and tetrahydric alcohols such as pentaerytritol, and the like.

A paint film formed of a polyester resin which starting material components include the aforementioned polyhydric alcohol possesses a problem with regard to their resistance to both hydrolysis and alkali, which in turn limits their use.

In addition, EP545108A discloses an alkyd resin consisting of a polyester comprising a diol which possesses an alkyl group having two or more carbon atoms in a side chain, and a melamine resin. However, the aforementioned publication does not include a concrete disclosure of a composition consisting of a polyester comprising 2,4-dialkyl-1,5-pentanediol, and a melamine resin.

Additionally, in the case of using a conventional polyester resin composition derived from a polyhydric alcohol as a paint, a defect in the paint film, caused by contaminants which exist in the painting environment, i.e., cissing tends to occur, and thus results in problems with the finish.

DISCLOSURE OF THE INVENTION

The present invention provides a resin composition containing a polyester resin possessing, within its molecular structure, a structural unit represented by the following formula (I) and an amino resin:

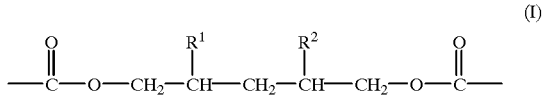

(I)

[wherein, $R^1$ and $R^2$ are the same or different and each represents a hydrogen atom or lower alkyl, with the proviso that $R^1$ and $R^2$ do not simultaneously represent hydrogen atoms]. In addition, the present invention provides a cured resin, obtained by means of hardening the aforementioned resin composition, and a paint comprising the aforementioned resin composition.

In the resin composition according to the present invention, the polyester resin, which is reacted with an amino resin, possesses a structural unit of the aforementioned formula (I), within its molecular structure. In this manner, the resin composition according to the present invention provides a cured resin exhibiting an excellent resistance to hydrolysis, resistance to alkali and resistance to cissing, after a reaction between the polyester resin and the amino resin, and thus, is suitable for the use as a paint and the like.

BEST MODES FOR CARRYING OUT THE INVENTION

The resin composition according to the present invention contains a polyester resin and an amino resin, with the polyester resin possessing a structural unit of the aforementioned formula (I).

In the definition of the aforementioned formula (I), examples of the lower alkyl may include a linear or branched chain alkyl group having 1 to 8 carbon atoms such as methyl, ethyl propyl, isopropyl, butyl, isobutyl, sec-butyl, tert-butyl, pentyl, isoamyl, neopentyl, 2-pentyl, 3-pentyl, hexyl, heptyl, octyl, and the like.

The polyester resin, a composition component of the resin composition according to the present invention, can be produced according to a conventional method, in which an esterification reaction is conducted using a polybasic acid and 2,4-dialkyl-1,5-pentanediol, the component which provides a structural unit represented by the formula (I). The structural unit in the polyester resin, represented by the formula (I), is formed by means of performing an esterification reaction, or a transesterification reaction, using 2,4-dialkyl-1,5-pentanediol, and a polybasic acid, an ester thereof, an animal or vegetable oil fatty acid, or the like.

In addition, other polyhydric alcohols, animal or vegetable oil fatty acids, animal or vegetable oils, or the like, may be added to the starting materials for the esterification reaction, if necessary.

Examples of the polybasic acid employed in the present invention include a compound containing two or more carboxyl groups per molecule, and a precursor thereof, (e.g., an acid anhydride). For example, succinic acid, glutaric acid, adipic acid, sebacic acid, fumaric acid, maleic acid, tetrahydrophthalic anhydride, hexahydrophthalic anhydride, het acid, pyromellitic anhydride, or the like may be employed; however, phthalic anhydride, isophthalic acid, or trimellitic anhydride is preferably used. These polybasic acids may be used alone or in combinations of two or more.

Specific examples of the 2,4-dialkyl-1,5-pentanediol include 2,4-dimethyl-1,5-pentanediol, 2-ethyl-4-methyl-1,5-pentanediol, 2-methyl-4-propyl-1,5-pentanediol, 2-isopropyl-4-methyl-1,5-pentanediol, 2,4-diethyl-1,5-pentanediol, 2-ethyl-4-propyl-1,5-pentanediol, 2-ethyl-4isopropyl-1,5-pentanediol, 2,4-dipropyl-1,5-pentanediol, 2-isopropyl-4-propyl-1,5-pentanediol, 2,4-diisopropyl-1,5-pentanediol, 2,4-dibutyl-1,5-pentanediol, 2,4dipentyl-1,5-pentanediol, 2,4dihexyl-1,5-pentanediol, 2,4-diheptyl-1,5-pentanediol, 2,4-dioctyl-1,5-pentanediol, and the like. Among these, 2,4-dimethyl-1,5-pentanediol, 2,4-diethyl-1,5-pentanediol, and 2,4dipropyl-1,5-pentanediol are preferred; and 2,4-diethyl-1,5-pentanediol is more preferred.

The aforementioned diol can be obtained by means of reacting a 2-butenal derivative with formaldehyde, and then further hydrogenating the resultant reaction product according to a known procedure as described, for example, in Japanese Published Unexamined Patent Application No. 48642/96 or EP807617A.

The aforementioned diols may be used alone or in combinations of two or more.

Examples of other polyhydric alcohols that may be used together include dihydric alcohols such as ethylene glycol, diethylene glycol triethylene glycol, propylene glycol, dipropylene glycol, 1,3-butanediol, 1,4-butanediol, neopentylglycol, and the like; trihydric alcohols such as glycerin, trimethylolethane, trimethylolpropane, and the like; and tetrahydric alcohols such as pentaerythritol, and the like.

Examples of the animal or vegetable oil fatty acid include soybean oil fatty acid, safflower oil fatty acid, tall oil fatty acid, linseed oil fatty acid, dehydrated castor oil fatty acid, tung oil fatty acid, and the like.

Examples of the animal or vegetable oil include soybean oil, safflower oil, linseed oil, dehydrated castor oil, tung oil, and the like.

As for the proportional content of the starting material components for the esterification reaction, the proportional content of the polybasic acid is in the range of 10~80% by weight with regard to the total weight of the starting materials, and preferably 25~60% by weight. Furthermore, the proportional content of the polyhydric alcohol is in the range of 10~80% by weight with regard to the total weight of the starting materials, and preferably 25~60% by weight. Additionally, the proportional content of 2,4-dialkyl-1,5-pentanediol is in the range of 5~100% by weight with regard to the total weight of the polyhydric alcohol components, and preferably 20~95% by weight. Additionally, in the case of using an animal or vegetable oil fatty acid, or animal or vegetable oil, the proportional content is no more than 60% by weight with regard to the total weight of the starting materials, and preferably no more than 40% by weight.

Herein, the starting materials for the esterification reaction include 2,4-dialkyl-1,5-pentanediol, and a polybasic acid, and if necessary, other polyhydric alcohols, animal or vegetable oil fatty acids, and animal or vegetable oils.

Furthermore, the starting materials for the esterification reaction are employed, with the molar ratio of the hydroxyl groups and carboxyl groups in the entire starting materials being in the range of 0.8:1.0 to 1.5:1.0, and preferably 0.9:1.0 to 1.3:1.0.

An insufficient amount of 2,4-dialkyl-1,5-pentanediol in the starting materials of the polyester resin results in unsatisfactory properties in the resultant polyester resin, i.e., resistance to hydrolysis, resistance to alkali, and resistance to cissing of the paint film become unsatisfactory. On the other hand, an excessively large amount of the aforementioned results in a reduction in the hardness of the paint film.

As a method for an esterification reaction to produce a polyester resin, for example, it is possible to perform an esterification reaction according to the method disclosed in Japanese Published Unexamined Patent Application No. 236229/89. In addition, in the process of an esterification reaction, if necessary, it is possible to use a catalyst for esterification. Examples of the catalyst for esterification include di-n-butyl tin oxide, tetrabutyltitanate, 2-ethylhexyltitanate, the catalysts for esterification disclosed in Japanese Published Unexamined Patent Application No. 120060/96 and U.S. Pat. No. 5,646,238, and the like.

In the case when an animal or vegetable oil is used together, it is possible to introduce an animal or vegetable oil into the polyester resin by means of performing an esterification reaction or a transesterification reaction, according to the method disclosed in Japanese Published Unexamined Patent Application, No. 236229/89.

The weight average molecular weight of the polyester resin is preferably in the range of 1,000~150,000, and more preferably in the range of 3,000~60,000. Accordingly, the polyester resin possesses numerous structural units represented by the formula (I), within its molecular structure.

The acid value of the polyester resin is preferably in the range of 2~20 mgKOH/g in the case of producing an oil-soluble varnish, and in the range of 20~60 mgKOH/g in the case of producing a water-soluble varnish.

The resin composition according to the present invention can be obtained by means of mixing a polyester resin and an amino resin. The cross-linked, cured resin can be obtained by means of reacting the polyester resin with the amino resin, contained in the resin composition according to the present invention. The aforementioned cured material contains the polyester resin possessing structural units represented by the aforementioned formula (I), and thus displays excellent resistance to hydrolysis, resistance to alkali, and resistance to cissing. Accordingly, the paint containing the resin composition according to the present invention provides a paint film exhibiting excellent resistance to hydrolysis, resistance to alkali, and resistance to cissing. Thus, the resin composition according to the present invention is particularly suitable for a paint.

The paint can be obtained from the resin composition according to the present invention, by means of adding a solvent, if necessary, to the polyester resin obtained according to the aforementioned method, to produce a varnish, and then adding an amino resin to the resultant varnish and uniformly mixing thereof.

The polyester resin is soluble in an organic solvent or water, and thus it is possible to prepare a varnish according to a known method, e.g., the method disclosed in Japanese Published Unexamined Patent Application No. 236229/89, and the like.

For example, an oil-soluble varnish can be obtained by means of diluting the polyester resin with an organic solvent such as xylene, toluene, mineral spirit, ethyl acetate, butyl acetate, cyclohexane, methylisobutylketone, butanol, and the like.

Additionally, a water-soluble varnish can be obtained by means of diluting the polyester resin with water, a water-soluble organic solvent (such as butyl cellosolve, butyl carbitol, ethyl cellosolve, ethyl carbitol, and the like), an aqueous solution thereof, or the like. In the case of preparing a water-soluble varnish, the polyester resin may be neutralized using a neutralizer such as triethylamine, dimethylaminoethanol, aqueous ammonia, or the like.

The proportional content of the diluting solvent for both an oil-soluble varnish and water-soluble varnish is 20~60% by weight with regard to the polyester resin, and preferably 30~50% by weight.

Examples of the amino resin, which is a composition component of the composition according to the present invention include a urea resin, melamine resin, guanamine resin, and the like, each of which is respectively obtained by means of reacting urea, melamine, guanamine, or the like, with formaldehyde; compounds obtained by means of an alkyl-etherification of the afore-mentioned resins using an alcohol having 1~6 carbon atoms; and the like.

Specific examples include methoxylated methylol urea, methoxylated methylol N,N-ethylene urea, methoxylated methylol dicyandiamide, methoxylated methylol benzoguanamine, and the like. Preferred examples may include methoxylated methylol melamine, and butoxylated methylol melamine; however, in general, a marketed product such as Sumimal M-50W (manufactured by Sumitomo Chemical Co., Ltd.) or the like, is employed.

The proportional content of the amino resin is not particularly limited, however, preferably 5~60 parts by weight of the amino resin per 100 parts by weight of the polyester resin are used.

If the proportional content of the aforementioned falls below 5 parts by weight, the amount of the amino resin is insufficient with respect to the amount of reactive groups, e.g., carboxyl groups and hydroxyl groups, contained in the polyester resin, which in turn will often lead to degradation in the resistance to hydrolysis and resistance to alkali of the cured substance. On the other hand, if the proportional content of the aforementioned exceeds 60 parts by weight, the amount of the amino resin becomes excessive, relative to the amount of reactive groups, e.g., carboxyl groups and hydroxyl groups, contained in the polyester resin, leading brittle of the cured substance.

In addition, it is possible to add a pigment such as titanium oxide, carbon black, zinc powder, and the like, to the resin composition according to the present invention, if necessary. In the case of using a pigment, in general, a pigment may be added to the resin composition according to the present invention, and dispersed for 0.1~5 hours by means of a paint shaker or the like; or the resin composition according to the present invention may be diluted using a diluting solvent such as those solvents disclosed in Japanese Published Unexamined Patent Application No. 120060/96, U.S. Pat. No. 5,646,238, and the like.

For example, in the case of using the resin composition according to the present invention as an oil-soluble paint, the resin composition may be diluted with xylene or the like; while in the case of using the resin composition as a water-soluble paint, the resin composition may be diluted with water, a water-soluble organic solvent (such as butyl cellosolve, butyl carbitol, ethyl cellosolve, ethyl carbitol and the like), or an aqueous solution thereof, according to the specific conditions.

In addition, the resin composition according to the present invention may be used jointly with a dispersant, wetting agent, suspending agent, antiflooding agent, anti-skinning agent, antistatic agent, antifungus agent, fire protection agent, or the like, as required for its purpose and use.

In the case of using the resin composition according to the present invention as a paint, a conventional painting method such as brush painting, spray painting, and the like may be employed; and a wide range of conditions from air-drying to thermal-drying may be selected as the curing method. Additionally, metal, wood, plastic, non-organic material, concrete, asphalt, and the like may be used as the object to be coated The paint film obtained from the resin composition according to the present invention exhibits excellent properties with regard to resistance to hydrolysis, resistance to alkali, and resistance to cissing.

In the following, the examples, comparative examples, reference examples, and test examples are described.

EXAMPLES

The weight average molecular weight (Mw), and the number average molecular weight (Mn) of the polyester resins in the reference examples were measured using Gel Permeation Chromatography (GPC). (Conditions for GPC analysis)

Column: TSKgel GMHXL, G4000XL, and G2000HXL (manufactured by Toso Inc.) were directly connected in series (column temperature: 40° C.)

Eluent: tetrahydrofuran (flow rate of 1.0 ml/min)

Reference Example 1

96.3 g of trimethylolpropane, 165.4 g of linseed oil fatty acid, 302.7 g of isophthalic acid, 209.2 g of 2,4-diethyl-1, 5-pentanediol, 1.0 g of di-n-butyl tin oxide, and 21 g of xylene were prepared together, and heated and stirred for 4 hours at 180° C. under a nitrogen flow. Subsequently, the temperature was raised to 220° C., and the reaction was allowed to continue for an additional 11 hours to yield the desired polyester resin.

Reference Example 2

The desired polyester resin was obtained in a manner similar to that in Reference Example 1, with the exception that 1,4-butanediol was used instead of 2,4diethyl-1,5-pentanediol.

Reference Example 3

The desired polyester resin was obtained in a manner similar to that in Reference Example 1, with the exception that neopentyl glycol was used instead of 2,4-diethyl-1,5-pentanediol.

Table 1 shows the respective preparation amounts used in Reference Examples 1, 2, and 3, as well as the acid value, the weight average molecular weight (Mw), and the number average molecular weight (Mn) of the obtained polyester resins.

TABLE 1

| Preparation amount (g) | Reference Example 1 | Reference Example 2 | Reference Example 3 |
|---|---|---|---|
| trimethylolpropane | 96.3 | 99.8 | 96.6 |
| linseed oil fatty acid | 165.4 | 174.4 | 168.7 |
| isophthalic acid | 302.7 | 363.7 | 352.0 |
| 2,4-diethyl-1,5-pentanediol | 209.2 | — | — |
| 1,4-butanediol | — | 149.5 | — |
| neopentyl glycol | — | — | 167.2 |
| Acid value (KOH mg/g) | 12.0 | 12.1 | 12.1 |
| Mw | 31300 | 36000 | 36000 |
| Mn | 1990 | 1980 | 1970 |

Reference Example 4

27.7 g of trimethylolpropane, 371.3 g of isophthalic acid, 379.2 g of 2,4-diethyl-1,5-pentanediol, 1.0 g of di-n-butyl tin oxide, and 21 g of xylene were prepared together, and heated and stirred for 4 hours at 180° C. under a nitrogen flow. Subsequently, the temperature was raised to 220° C., and the reaction was allowed to continue for an additional 11 hours to yield a polyester resin.

Reference Example 5

A polyester resin was obtained in a manner similar to that in Reference Example 4, with the exception that neopentyl glycol was used instead of 2,4-diethyl-1,5-pentanediol.

Table 2 shows the respective preparation amounts used in Reference Examples 4 and 5, as well as the acid value, the weight average molecular weight (Mw), and the number average molecular weight (Mn) of the obtained polyester resins.

TABLE 2

| Preparation amount (g) | Reference Example 4 | Reference Example 5 |
|---|---|---|
| triethylolpropane | 27.7 | 34.8 |
| isophthalic acid | 371.3 | 465.8 |
| 2,4-diethyl-1,5-pentanediol | 379.2 | — |

TABLE 2-continued

| Preparation amount (g) | Reference Example 4 | Reference Example 5 |
|---|---|---|
| neopentyl glycol | — | 298.1 |
| Acid value (KOH mg/g) | 10.1 | 10.2 |
| Mw | 21000 | 25000 |
| Mn | 1510 | 1590 |

Reference Example 6

145.1 g of trimethylolpropane, 165.0 g of linseed oil fatty acid, 252.3 g of isophthalic acid, 148.1 g of 2,4-diethyl-1,5-pentanediol, 1.0 g of di-n-butyl tin oxide, and 21 g of xylene were prepared together, and heated and stirred for 4 hours at 180° C. under a nitrogen flow. Subsequently, the temperature was raised to 220° C., and the reaction was allowed to continue for an additional 4.5 hours. When the acid value of the resin decreased to 15~20 mgKOH/g, 57.4 g of trimellitic anhydride was added thereto, and the reaction was allowed to continue for an additional 2 hours at 220° C. to yield a polyester resin.

Reference Example 7

A polyester resin was obtained in a manner similar to that in Reference Example 6, with the exception that 1,4-butanediol was used instead of 2,4-diethyl-1,5-pentanediol.

Reference Example 8

A polyester resin was obtained in a manner similar to that in Reference Example 6, with the exception that neopentyl glycol was used instead of 2,4-diethyl-1,5-pentanediol.

Reference Example 9

A polyester resin was obtained in a manner similar to that in Reference Example 6, with the exception that 3-methyl-1,5-pentanediol was used instead of 2,4-diethyl-1,5-pentanediol.

Tables 3-1 and 3-2 show the respective preparation amounts used in Reference Examples 6~9, as well as the acid value, the weight average molecular weight (Mw), and the number average molecular weight (Mn) of the obtained polyester resins.

TABLE 3-1

| Preparation amount (g) | Reference Example 6 | Reference Example 7 | Reference Example 8 |
|---|---|---|---|
| trimethylpropane | 145.1 | 42.6 | 139.1 |
| linseed oil fatty acid | 165.4 | 166.6 | 162.5 |
| isophthalic acid | 252.3 | 292.2 | 285.0 |
| 2,4-diethyl-1,5-pentanediol | 148.1 | — | — |
| 1,4-butanediol | — | 112.2 | — |
| neopentyl glycol | — | — | 126.5 |
| trimellitic arilydide | 57.4 | 64.1 | 62.5 |
| Acid value (KOH mg/g) | 37.1 | 36.9 | 37.0 |
| Mw | 33000 | 34000 | 42000 |
| Mn | 2050 | 2030 | 2050 |

TABLE 3-2

| Preparation amount (g) | Reference Example 9 |
|---|---|
| trimethylolpropane | 135.0 |
| linseed oil fatty acid | 158.5 |
| isophthalic acid | 278.4 |
| trimellitic acid | 61.1 |
| 3-methyl-1,5-penenediol | 139.8 |
| Acid value (KOH mg/g) | 36.3 |
| Mw (the weight average molecular weight) | 25000 |
| Mn (the number average molecular weight) | 3100 |
| Varnish viscosity | Z3+ |

Example 1

The polyester resin obtained in Reference Example 1 was diluted with xylene to yield an oil-soluble varnish which contains 60% by weight of non-volatile substance (Gardner viscosity: Z).

Furthermore, 158.2 g of rutile-type titanium dioxide and 10 g of xylene were added to 104 g of the resultant oil-soluble varnish, and the mixture was dispersed for 1 hour at room temperature, using a paint shaker. Subsequently, 104 g of an oil-soluble varnish and 30 g of melamine resin (Sumimal M-50W, manufactured by Sumitomo Chemical Co., Ltd.) were added thereto, and the resultant mixture was diluted with xylene to yield a white-colored, resin composition, the viscosity of which was 40 seconds according to a Ford Cup (No. 4) (JIS K-5400).

Comparative Example 1

The polyester resin obtained in Reference Example 2 was treated in a manner similar to that in Example 1 to yield an oil-soluble varnish with a non-volatile content of 60% by weight (Gardner viscosity: Z3). The resultant oil-soluble varnish was likewise treated in a manner similar to that in Example 1 to yield a resin composition.

Comparative Example 2

The polyester resin obtained in Reference Example 3 was treated in a manner similar to that in Example 1 to yield an oil-soluble varnish with a non-volatile content of 60% by weight (Gardner viscosity: Z2). The resultant oil-soluble varnish was likewise treated in a manner similar to that in Example 1 to yield a resin composition.

Example 2

The polyester resin obtained in Reference Example 4 was diluted with xylene to yield an oil-soluble varnish with a non-volatile content of 60% by weight (Gardner viscosity: Z2). The resultant oil-soluble varnish was likewise treated in a manner similar to that in Example 1 to yield a resin composition.

Comparative Example 3

The polyester resin obtained in Reference Example 5 was treated in a manner similar to that in Example 1 to yield an oil-soluble varnish with a non-volatile content of 60% by weight (Gardner viscosity: Z6). The resultant oil-soluble varnish was likewise treated in a manner similar to that in Example 1 to yield a resin composition.

Example 3

The polyester resin obtained in Reference Example 6 was dissolved in 210 g of butyl cellosolve 210 g. Subsequently, the resultant solution was neutralized with 47.0 g of triethylamine, and water was added thereto to yield a water-soluble varnish with a non-volatile content of 70% by weight (Gardner viscosity: Z3).

158.2 g of rutile-type titanium dioxide, 3.5 g of butyl cellosolve, and 60 g of water were added to 50 g of the water-soluble varnish obtained above, and then the mixture was dispersed for 1 hour at room temperature, using a paint shaker. Subsequently, 89 g of water-soluble varnish, 30 g of melamine resin (Sumimal M-50W, manufactured by Sumitomo Chemical Co., Ltd.), and 10 g of water were added thereto, and the resultant mixture was diluted with a 10% aqueous butyl cellosolve solution to yield a resin composition, the viscosity of which was 60 seconds according to a Ford Cup (No. 4) (JIS K-5400).

Comparative Example 4

The polyester resin obtained in Reference Example 7 was treated in a manner similar to that in Example 3 to yield a water-soluble varnish with a non-volatile content of 70% by weight (Gardner viscosity: Z3~Z4). The resultant water-soluble varnish was likewise treated in a manner similar to that in Example 3 to yield a resin composition.

Comparative Example 5

The polyester resin obtained in Reference Example 8 was treated in a manner similar to that in Example 3 to yield a water-soluble varnish with a non-volatile content of 70% by weight (Gardner viscosity: Z5). The resultant water-soluble varnish was treated in a manner similar to that in Example 3 to yield a resin composition.

Comparative Example 6

The polyester resin obtained in Reference Example 9 was treated in a manner similar to that in Example 3 to yield a water-soluble varnish with a non-volatile content of 70% by weight (Gardner viscosity: Z3+). The resultant water-soluble varnish was treated in a manner similar to that in Example 3 to yield a resin composition.

Test Example 1

The resin compositions obtained in Example 1, and Comparative Examples 1 and 2 were respectively sprayed for painting on a dull finished steel plate which had been treated with zinc phosphate, and the coated resin compositions were baked for 20 minutes at 140° C. Subsequently, an evaluation of the paint film performance was conducted. For the paint film performance evaluation, the pencil hardness, gloss, resistance to hot water, resistance to alkali, and resistance to salt spray were evaluated, according to JIS K-5400. In addition, for the salt spray test, the paint film was cross cut to the bare surface, and after resistance to salt spray was tested, the width of blistering from the cut was measured. Subsequently, one hour after the test plate was removed from the test equipment, the width of peeling was measured when cellophane adhesive tape was applied.

In addition, resistance to cissing was evaluated according to the method described in the following.

Evaluation of Resistance to Cissing 1 g of Cosmo Gear Oil SE100 (manufactured by Cosmo Oil Co., Ltd.) was diluted with 1000 g of toluene to obtain a 0.1% oil dilution. This dilution was sprayed for one second on a 15 cm by 30 cm dull finished steel plate which had been treated with zinc phosphate, using a spray gun from a 40 cm distant from the plate, to produce an oil-contaminated object.

After the aforementioned resin composition was sprayed for painting on this oil-contaminated object, and setting was performed for 15 minutes, the object was baked for 20 minutes at 140° C. The object was then ranked into five grades, according to the number of cissing drops on the 15 cm by 30 cm paint film. A smaller number of cissing drops indicates a paint film with an excellent external appearance.

Table 4 shows the method for ranking into the five grades used in the evaluation of resistance to cissing.

TABLE 4

| The number of cissing drops | Ranking |
|---|---|
| 5 or less | 5 |
| 10 or less | 4 |
| 25 or less | 3 |
| 50 or less | 2 |
| 50 or above | 1 |

The results of Test Example 1 are shown in Table 5.

TABLE 5

| Evaluation items | | Example 1 | Comparative Example 1 | Example 2 |
|---|---|---|---|---|
| Thickness of paint film ($\mu$m) | | 24 | 26 | 23 |
| Pencil hardness | | H | 2H | 2H |
| Gloss (%) | | 85 | 83 | 86 |
| Resistance to hot water (40° C.) | 48 hours | no change | no change | no change |
| | 72 hours | no change | slight blistering | slight blistering |
| | 120 hours | no change | slight blistering | slight blistering |
| Resistance to alkali (3% NaOH, 20° C.) | 48 hours | no change | no change | no change |
| | 72 hours | no change | blistering | no change |
| | 120 hours | no change | blistering | blistering |
| Resistance to salt spray (120 hrs) | width of blistering (mm) | 0.5 | 0.5 | 0.5 |
| | width of peeling (mm) | 0.5 | 0.5 | 0.5 |
| Resistance to cissing | | 5 | 4 | 4 |

(cf. 1) The paint film was cross cut to the bare surface, and after resistance to salt spray was tested, the width of blistering from the cut was measured. Furthermore, 1 hour after the test plate was removed from the test equipment, the width of peeling was measured when cellophane adhesive tape was applied.

As shown in Table 5, the paint film obtained from the resin composition according to the present invention exhibits excellent resistance to hydrolysis, resistance to alkali, and resistance to cissing, compared to the paint films obtained in Comparative Examples.

Test Example 2

The paint film performance with regard to the resin compositions obtained in Example 2 and Comparative Example 3 were evaluated in the same manner as in Test Example 1. The results are shown in Table 6.

TABLE 6

| Evaluation items | | Example 2 | Comparative Example 3 |
|---|---|---|---|
| Thickness of paint film ($\mu$m) | | 23 | 22 |
| Pencil hardness | | 2H | 3H |
| Gloss (%) | | 82 | 81 |
| Resistance to hot water | 48 hours | no change | no change |
| | 72 hours | no change | blistering |

TABLE 6-continued

| Evaluation items | | Example 2 | Comparative Example 3 |
|---|---|---|---|
| (40° C.) | 120 hours | no change | blistering |
| Resistance to | 48 hours | no change | no change |
| alkali (3% | 72 hours | no change | blistering |
| NaOH, 20° C.) | 120 hours | no change | bulging |
| Resistance to salt spray (120 hrs) | Width of blistering (mm) | 0.5 | 0.5 |
| | width of peeling (mm) | 0.5 | 0.5 |
| Resistance to cissing | | 5 | 3 |

(cf. 1) The paint film was cross cut to the bare surface, and after resistance to salt spray was tested, the width of blistering from the cut was measured. Furthermore, 1 hour after the test plate was removed from the test equipment, the width of peeling was measured when cellophane adhesive tape was applied.

As shown in Table 6, the paint film obtained from the resin composition according to the present invention exhibits excellent resistance to hydrolysis, resistance to alkali, and resistance to cissing, compared to the paint film obtained in Comparative Example.

Test Example 3

The paint film performance with regard to the resin compositions obtained in Example 3 and Comparative Examples 4, 5, and 6 were evaluated in the same manner as in Test Example 1. For the paint film performance evaluation, the pencil hardness, gloss, resistance to hot water, resistance to alkali, and resistance to salt spray were evaluated, according to JIS K-5400.

In addition, a paint storage stability test was performed according to the following method.

Paint Storage Stability Test

The resin compositions obtained in Example 3, and Comparative Examples 4, 5 and 6 were respectively poured into a container with a capacity of 250 ml to a depth of 80 mm, and after the container was sealed and kept for 7 days at 50° C., the viscosity of the resin composition was measured, and the degree of phase separation thereof was expressed by the thickness of the upper layer (mm)/the total depth (mm). The viscosity of the resin composition was measured using a Ford Cup No. 4 (JIS K5400).

The results of Test Example 3 are shown in Table 7-1 and 7-2.

TABLE 7-1

| Evaluation items | | Example 3 | Comparative Example 4 | Comparative Example 5 |
|---|---|---|---|---|
| (Paint film performance) | | | | 27 |
| Thickness of paint film (μm) | | 26 | 24 | |
| Pencil hardness | | H | 2H | 2H |
| Gloss (%) | | 89 | 86 | 89 |
| Resistance to hot water (40° C.) | 48 hours 120 hours | no change no change | no change no change | no change no change |
| Resistance to alkali | 6 hours 24 hours | no change no change | blistering blistering | no change blistering |
| Resistance to salt | Width of blistering (mm) | 0.5 | 1.0 | 0.5 ~ 1.0 |

TABLE 7-1-continued

| Evaluation items | | Example 3 | Comparative Example 4 | Comparative Example 5 |
|---|---|---|---|---|
| spray (120 hrs) | width of peeling (mm) | 0.5 | 1.0 | 0.5 ~ 1.0 |
| Resistance to cissing (Paint stability) | | 4 | 3 | 3 |
| Initial stage | viscosity (sec) | 60 | 61 | 60 |
| | pH | 9.0 | 9.0 | 9.0 |
| after 7 days, kept at 50° C. | viscosity (sec) | 75 | 110 | 90 |
| | pH | 8.8 | 8.0 | 8.5 |
| | external appearance | 3/80 | 35/80 | 10/80 |

(cf. 1) Viscosity: Measured using Ford Cup No. 4 (JIS K5400).
(cf. 2) External appearance: The paint was poured into a container with a capacity of 250 ml to a depth of 80 mm, and the container was sealed and kept at 50° C. in a thermostat. The degree of separation in the paint was expressed by the thickness of the upper layer / the total depth (mm/mm).
(cf. 3) Resistance to alkali: Evaluated at 20° C. in an aqueous NaOH solution of concentration of 3% by weight.

TABLE 7-2

| Evaluation items | | Comparative Example 6 |
|---|---|---|
| Thickness of paint film (μm) | | 24 |
| Pencil hardness | | 2H |
| Gloss (%) | | 82 |
| Resistance to hot water (40° C.) | 48 hours 120 hours | no change no change |
| Resistance to alkali | 6 hours 24 hours | no change blistering |
| Resistance to salt spray (120 hrs) | width of blistering (mm) width of peeling (mm) | 0.5 ~ 1.0 0.5 ~ 1.0 |
| Resistance to cissing | | 3 |
| initial stage | viscosity (sec) | 56 |
| | pH | 9.0 |
| After 7 days, Kept at 50° C. | viscosity (sec) | 74 |
| | pH | 8.1 |
| | external appearance (separating layer) mm/mm | 15/80 |

As shown in Table 7-1 and 7-2, the paint film obtained from the resin composition according to the present invention exhibits excellent resistance to alkali and resistance to cissing, compared to those of Comparative Examples. Furthermore, the paint storage stability is excellent.

INDUSTRIAL APPLICABILITY

The resin composition according to the present invention provides a cured material which exhibits excellent resistance to hydrolysis, resistance to alkali, and resistance to cissing. Thus, the resin composition according to the present invention is useful as a paint and the like.

What is claimed is:

1. A resin composition comprising a polyester resin possessing, within its molecular structure, a structural unit represented by the following formula (I), and an amino resin:

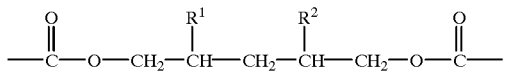 (I)

wherein, $R^1$ and $R^2$ are the same or different and each represents a hydrogen atom or lower alkyl, with the proviso that $R^1$ and $R^2$ do not simultaneously represent hydrogen atoms.

2. The resin composition according to claim 1, wherein the weight average molecular weight of said polyester resin is in the range of 1,000~150,000.

3. The resin composition according to claim 2, wherein the weight average molecular weight of said polyester resin is in the range of 3,000~60,000.

4. The resin composition according to claim 1, wherein said polyester resin is obtained by means of an esterification reaction of a polyhydric alcohol containing 5~100% by weight of 2,4-dialkyl-1,5-pentanediol, and a polybasic acid.

5. The resin composition according to claim 1, wherein both of $R^1$ and $R^2$ are ethyl groups.

6. A cured resin obtained by means of hardening the resin composition according to any one of claims 1~5.

7. A paint comprising the resin composition according to any one of claims 1~5.

* * * * *